Patented Feb. 8, 1927.

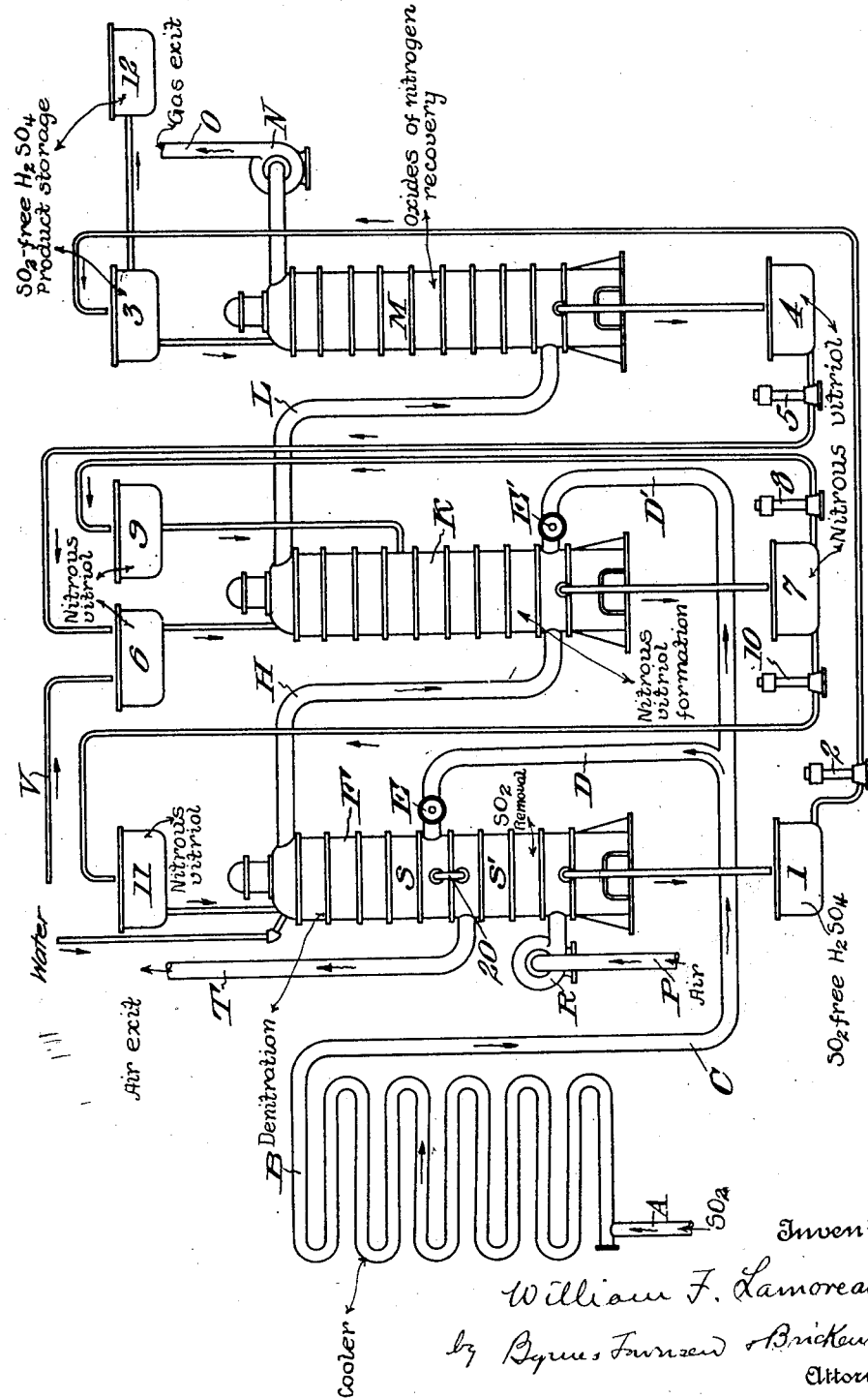

1,617,212

UNITED STATES PATENT OFFICE.

WILLIAM F. LAMOREAUX, OF ISABELLA, TENNESSEE.

PROCESS OF MAKING SULPHURIC ACID.

Continuation of application Serial No. 14,305, filed March 9, 1925. This application filed June 13, 1925.
Serial No. 36,907.

This invention relates to an improved process or method of producing sulphuric acid from sulphur dioxide obtained from the burning of elemental sulphur, or from oxides of sulphur such as are contained in variable admixture with air in the gases generated by or liberated from any furnace, smelting, roasting, or calcining pyrite ores or other sulphur bearing materials.

In the manufacture of sulphuric acid by the well known chamber process, the sulphur dioxide is oxidized through the intermediary use of oxy-nitrogen compounds which are used either in gaseous state or in the liquid state, i. e., in solution with sulphuric acid. These oxy-nitrogen compounds act as pseudo-catalysts and accelerate the union of the sulphur dioxide with oxygen; but in the process these oxy-nitrogen compounds are themselves reduced or decomposed and are thus liberated into the gaseous phase as lower oxides of nitrogen but principally as nitric oxide. In the gaseous phase, these lower oxides of nitrogen will escape to the atmosphere unless they be re-oxidized and absorbed, and thus recovered, in the Gay-Lussac tower which is ordinarily employed for that purpose.

It is well known that, owing to various disturbances which commonly occur in the acid making process, the Gay-Lussac tower rarely functions perfectly for the complete absorption of the oxy-nitrogen compounds, and consequently there is almost at all times some escape of these compounds to the atmosphere, thus resulting not only in a costly loss but also creating a noxious and disagreeable nuisance to surrounding habitation.

Furthermore, the oxy-nitrogen compounds, whether having been partially or wholly absorbed in the Gay-Lussac tower, must subsequently be returned to the acid making system to resume their rôle as oxygen-carriers or catalysts and for this purpose the Glover tower is employed, but here again the purpose is but rarely completely or perfectly accomplished, due to the fact that the higher grades of sulphuric acid, i. e. acid of higher than about 58° Bé. gravity, are not readily denitrated except through prolonged contact with sulphur dioxide and the application of high temperatures; consequently the sulphuric acid leaving the Glover tower usually contains appreciable amounts of oxy-nitrogen compounds still in solution and in corresponding measure there results a loss of these compounds in the acid that is withdrawn from the system for commercial use. Thus again, not only does a costly loss occur, but when such sulphuric acid, containing even small amounts of oxy-nitrogen compounds in solution, is used for various commercial purposes (i. e. in acid phosphate manufacture, in the "pickling" of iron or steel, or in the manufacture of glycerine) many serious objections or even difficulties arise so that such acid is not desired by the industrial trade.

If, on the other hand, however, a complete denitration of the sulphuric acid is undertaken in the Glover tower through more prolonged contact with sulphur dioxide, particularly at comparatively low temperatures, the sulphuric acid will then usually be found to contain appreciable amounts of sulphur dioxide in solution and such acid is also objectionable for certain industrial uses.

The denitrated and more concentrated acid obtained from the Glover tower is used in the Gay-Lussac tower for absorption of the oxy-nitrogen compounds that would otherwise escape from the chamber system, and it has commonly been found that the presence of either oxy-nitrogen compounds or sulphur dioxide initially present in solution in the sulphuric acid even in slightly appreciable amounts greatly interferes with the absorption properties of the acid; it is obvious that even small amounts of oxy-nitrogen compounds in solution in the acid will to that extent diminish its total absorption power,— or, if any sulphur dioxide is initially in solution, it will inhibit absorption through the following reaction:

the nitric oxide, NO, being but slightly soluble in the sulphuric acid, remains in the gaseous phase unabsorbed and so escapes to the atmosphere.

In my present invention I avoid the difficulties which usually occur in the operation of the ordinary chamber acid process and also prevent the escape of noxious gases to the atmosphere; at the same time, I produce sulphuric acid which is free from either oxy-nitrogen compounds or sulphur dioxide and therefore more suitable to the requirements of the industrial trade.

In my U. S. Patent No. 1,456,064, issued

May 22, 1923, there is disclosed a process of manufacturing sulphuric acid from sulphur dioxide which consists in introducing gases reacting to form sulphuric acid into a Glover tower, introducing the gases from the Glover tower into a reacting chamber in which the gases and liquids are brought in enforced intimate contact through the application of mechanical means, delivering the gases from the reacting chamber into an absorption tower similarly mechanically operated, and delivering the acid from the absorption tower to the reacting chamber, the acid liquid from the reacting chamber to the Glover tower and the sulphuric acid from the Glover tower to the absorption tower and to storage, all as described and illustrated in the specification and drawings of said Letters Patent. According to the above disclosures, a Glover tower may be employed for the usual purpose of denitrating and concentrating the sulphuric acid which is then used for absorption of the nitrogen oxides that have been liberated in the course of the preceding chemical reactions.

Now, my present invention is a modification of and improvement in the manufacture of sulphuric acid as disclosed in my Patent No. 1,456,064. I dispense with the use of the Glover tower entirely, for I have discovered that the reactions can be so conducted and controlled in the course of the oxidation of the sulphur dioxide that the acid is entirely denitrated before leaving the apparatus wherein the reactions take place, following which the acid can be thoroughly washed with air (or an inert gas such as carbon dioxide) to remove any trace of sulphur dioxide that otherwise might be left dissolved in the acid, and the acid so delivered to the absorption apparatus will possess the greatest possible absorption power for the removal and retention of the oxy-nitrogen compounds that are there to be recovered.

According to my invention, I employ oxy-nitrogen compounds, either in the gaseous state or in solution in a liquid state, or both, as the oxygen carriers or pseudo-catalysts wherewith, in the presence of atmospheric oxygen, sulphur dioxide is utilized to produce sulphuric acid. The use of oxy-nitrogen compounds for this purpose is, of course, well known in the art, but I believe I am the first to have discovered or recognized and disclosed the enormously accelerated rate at which sulphuric dioxide can be oxidized and converted into sulphuric acid by intermingling the gas phase and liquid phase components of these reactions in a state of intensely high dispersion, as described and claimed in my Patent No. 1,456,064.

I achieve an intense dispersion of the two phases such as may be obtained, for example, by the employment of a high speed gas washer, e. g., a washer of the Feld type having a peripheral speed of 2,000 feet per minute. With such an apparatus the liquid is dispersed in the gas and the gas is also dispersed in the liquid; the films so obtained are rapidly coalesced and therefore a fresh surface is continuously exposed many times per second. To shortly describe the condition thus produced I have used in the claims the term "intense highly dispersed phase contact".

An apparatus suitable for carrying out the process is shown in the drawing, in which A designates the flue leading from the source of sulphur dioxide (i. e., from a roasting furnace, sulphur burner, etc.), thence the sulphur dioxide bearing gases are led through the cooling pipe B where the temperature of the gases is reduced to approximately that of the atmosphere, the exterior of the cooling pipe B being cooled through exposure to the air or by means of water. Any other method of cooling the gases may, of course, be employed. The sulphur dioxide bearing gases, after having been thus cooled, are then conducted through the flue C, D, and D' to the valves E and E' which control the admission and flow of the gases into the Feld washers F and K. The Feld washer F is divided into two parts, S and S', separated in such manner that the liquid flowing through the upper part S can pass downward through pipe 20 into and through the lower part S'; but the gases entering S and S' cannot intermix,—the object of this arrangement will be fully understood in later discourse. That portion of the gases which is admitted through the valve E passes into and through S and thence by means of pipe H into the lower section of the Feld washer K. The valve E' admits a portion of the sulphur dioxide bearing gases into the lower section of the apparatus K also of the Feld washer type, where it unites with the gases that enter through pipe H. The united flow of gases then passes upward through K, thence through pipe L into and through the Feld washer M, thereupon to enter the centrifugal fan N and to be discharged to the atmosphere through the exit pipe O. The apparatus K and the upper part S of apparatus F are employed for the purpose of oxidizing the sulphur dioxide and constitute the essential reaction apparatus wherein the sulphuric acid is produced. In this apparatus, some nitric oxide, NO, and other gaseous oxy-nitrogen compounds are formed, and to recover these valuable compounds the gases are conducted to the apparatus M wherein are performed the reactions sought to be accomplished usually by the use of Gay-Lussac towers, i. e., the oxidation, absorption and retention in solution of all of the gaseous oxy-nitrogen compounds that otherwise would escape to the atmosphere. By means of centrifugal pumps, operated according to the usual practice in acid manufacture, the sulphuric acid is circulated throughout the plant as follows:— thus, (a) the tank 11 contains nitrous vitriol which has been pumped from tank 7 by means of pump 10, and from tank 11 the acid is admitted into the top of the Feld washer F wherein it flows downward from one section to another at the same time encountering in counter-flow direction the ascending sulphur dioxide bearing gases that enter through the valve E. The flow of nitrous vitriol entering F is so regulated both as to quantity and quality of niter content that upon entering S' it will have been entirely denitrated according to the reaction:

$$2HSNO_5 + 2H_2O + SO_2 = 3H_2SO_4 + 2NO.$$

The liberated nitric oxide, NO, together with the residual gases, is conducted by pipe H to the lower section of apparatus K where it unites with more sulphur dioxide admitted through valve E'. The admission of gas through valve E' is so regulated that the nitrosity of the acid flowing into tank 7 (part of which is pumped to tank 11) may be kept at a predetermined amount and thereby governing also the quantitative oxidation of the sulphur dioxide and its complete conversion into sulphuric acid, and which in turn depends upon the sulphur dioxide content of the gases being treated. The denitrated acid entering and flowing downward through S' encounters in counter-flow direction an ascending flow of air induced through pipe P by means of the centrifugal fan R; a sufficient volume of air being thus passed through S' to thoroughly and completely displace and remove any trace of oxy-nitrogen compounds or sulphur dioxide that might otherwise be retained in solution in the acid, and discharged through pipe T; by this means the acid flowing to tank 1 is entirely free of either of these compounds so that upon being delivered by means of pump 2 to tank 3 it is in the most desirable condition for further use in the recovery of oxy-nitrogen compounds in apparatus M, or to be transferred to the storage tank 12 for commercial use; and (b) the sulphur dioxide bearing gases ascending through apparatus K encounter the descending flow of strong nitrous vitriol that is admitted from tank 6, the latter flow of nitrous vitriol is also augmented by the superimposed flow of weaker nitrous vitriol which is continuously pumped from tank 7 by means of pump 8 to tank 9 and thence flowing into one of the mid-sections of apparatus K. It will be observed that the gases rich in sulphur dioxide and oxygen entering apparatus F and also apparatus K are brought into contact with the weaker nitrous vitriol, while as they ascend through the apparatus, they come into contact with nitrous vitriol of gradually increasing strength; by this means the chemical equilibrium of this reaction can be progressively governed and maintained throughout, resulting finally in the complete or substantially complete oxidation of the sulphur dioxide; and (c) the gases leaving apparatus K will contain in admixture various gaseous oxy-nitrogen compounds which should be recovered,—they are therefore conducted through pipe L to the apparatus M where they are caused to ascend in counter-current direction in contact with the descending flow of sulphuric acid admitted from tank 3. The strong nitrous vitriol thus formed flows to tank 4 and from there is elevated to tank 6 by means of pump 5; and (d) through the pipe V there may be introduced into the system additional amounts of oxy-nitrogen compounds such as may be required from time to time to make up any depletion that normally occurs through the gradual loss of these compounds, the amount added being so regulated that the total amount of oxy-nitrogen compounds in circulation in the plant is at all times kept definitely proportioned to the amount of sulphur dioxide to be oxidized; and (e) water is, of course, introduced into the system as and when required to maintain the proper working conditions and to supply the chemical reaction requirements,—the introduction of the water being usually made into the top section of apparatus F as indicated; and (f) for the purpose of cooling the acid, cooling or refrigerating coils may be placed in any or all of the tanks 1, 3, 4, 6, 7, 9 and 11 and apparatuses E, K and M shown in the accompanying drawing. By means of such an acid circulating system, the proper quantities and qualities of circulating acids, cooled to the proper working temperatures, can be easily kept under control so as to maintain a uniformity of quantitative and qualitative factors throughout the whole cycle of the chemical reaction; for, owing to the rapid circulation of both the gaseous and the liquid materials and the conveniently afforded means of regulating the quantities of these materials in varying proportion to each other, faulty conditions of operation can be promptly ascertained and corrections as promptly made, this elasticity of control being of the greatest importance in the manufacture of sulphuric acid.

The arrangement of the upper and lower portions, S and S' respectively, in the one piece of apparatus F as shown is but illustrative of one method of arrangement for economical reasons in the case of a plant of comparatively small output, whereas in a plant of larger output two Feld washers might be employed, each respectively to perform the functions described for S and S'.

And although I have chosen the Feld washer of vertical type to illustrate one method of carrying my invention into effect, I may employ any one of several well known rotary or centrifugal types of gas washers;—indeed, any type of apparatus that will produce such a state of high dispersion as to present the extreme area of reacting surface between the gases and liquids may be used to carry out the purpose of my invention but it is quite essential that with whatever type of apparatus that may be used there shall be effected a continuously proceeding method of dispersing the liquid phase components in order to produce newly formed surface films for the adsorption of the gaseous phase components and immediately or simultaneously causing the disruption of such adsorbed films substantially as soon as formed, by coalescence in a collecting mass of liquid, said dispersion and coalescence continuing in a rapidly repeated cyclic order.

Referring to the apparatus illustrated in the drawing accompanying this specification, within which the various reactions are caused to take place, it will be understood that the size and shape of the apparatus, the construction and general arrangement of the internal stationary or movable parts, the location and size of the inlet and outlet openings for the admission and escape of the gases and liquids, and whether said openings are so arranged as to cause the gases to pass vertically upward or downward or to pass horizontally through or over the liquids, have no specific bearing upon the principle of my invention other than to show one way by which it is carried into effect, and may be materially modified without in the least departing from the scope of my invention.

This application is a continuation of my application Serial No. 14,305, filed March 9, 1925.

I claim:

1. In a process for making sulphuric acid, the method which consists in the following steps: (1) bringing sulphur dioxide containing gases into intimate highly dispersed phase contact with nitrous vitriol regulated in quantity and quality so that the resulting sulphuric acid is completely denitrated; (2) subjecting the thus produced acid to intimate highly dispersed phase contact with a current of gas to remove any residual sulphur dioxide gas; and (3) collecting the resulting purified sulphuric acid.

2. In a process for making sulphuric acid the method which consists in (1) bringing gases containing sulphur dioxide into intimate highly dispersed phase contact with nitrous vitriol regulated in quantity and quality so that the resulting sulphuric acid is completely denitrated; (2) producing said nitrous vitriol by bringing nitrous gases from the denitrating operation and a regulated quantity of gases containing sulphur dioxide in ascending flow into intimate highly dispersed phase contact with down-flowing nitrous vitriol of gradually increasing strength; (3) passing at least a part of the thus produced nitrous vitriol to the denitrating operation; (4) absorbing gaseous oxy-nitrogen compounds resulting from said second step by intimate highly dispersed phase contact with sulphuric acid; and (5) delivering the nitrous vitriol from the absorbing operation to the second step.

3. In a process for making sulphuric acid the step of producing nitrous vitriol of predetermined quality which consists in bringing gases containing nitrogen oxides and regulated quantities of gases containing sulphur dioxide into intimate highly dispersed phase contact and in counter-current flow with nitrous vitriol of gradually increasing strength.

4. In a process for making sulphuric acid the step of producing nitrous vitriol of predetermined quality which consists in bringing gases containing nitrogen oxides and regulated quantities of gases containing sulphur dioxide into intimate highly dispersed phase contact and in counter-current flow with nitrous vitriol, circulating a portion of the nitrous vitriol thus produced and denitrating the remaining portion to form sulphuric acid.

5. In a process for making sulphuric acid, the method of producing nitrous vitriol of predetermined strength which consists in bringing gases containing nitrogen oxides and regulated quantities of gases containing sulphur dioxide into intimate highly dispersed phase contact in counter-current flow and in successive stages, introducing nitrous vitriol at an intermediate stage and stronger nitrous vitriol at a later stage, collecting the nitrous vitriol at the initial stage and removing the nitrous gases at the final stage.

6. In a method as claimed in claim 5, the method which comprises absorbing the nitrous gases in sulphuric acid to produce said stronger nitrous vitriol.

7. The process of purifying sulphuric acid from sulphur dioxide which consists in passing a current of gas therethrough to carry off the sulphur dioxide.

8. The process as claimed in claim 7 in which the acid is subjected to intimate highly dispersed phase contact with the current of gas 9. The process of denitrating nitrous vitriol which consists in contacting the nitrous vitriol with sulphur dioxide containing gases in such proportions and under such conditions as to produce complete denitration, and thereafter contacting the denitrated acid with a gas free from sulphur dioxide and oxides of nitrogen to remove sulphur dioxide from the acid.

10. In processes of making sulphuric acid involving the use of oxides of nitrogen, the steps which consist in contacting at least a part of the sulphur dioxide containing gas supply with nitrous vitriol produced in the process in such proportions and under such conditions as to produce complete denitration, contacting the denitrated acid with air to remove sulphur dioxide therefrom, and using at least a part of the resulting acid for absorbing oxides of nitrogen.

11. In a process for making sulphuric acid the steps which consist in contacting a part of the sulphur dioxide containing gas supply with nitrous vitriol produced in the process in such proportions and under such conditions as to produce complete denitration contacting the resulting denitrated acid with air to free it from sulphur dioxide, contacting the gases resulting from the denitrating step and the remainder of the sulphur dioxide containing gas supply with a countercurrent flow of nitrous vitriol of progressively increasing strength, contacting the resulting gases with at least a part of the acid produced by contacting the denitrated acid with air and delivering the resulting acid to said countercurrent flow of nitrous vitriol, and delivering at least a part of said countercurrent flow of nitrous vitriol to the denitrating step.

In testimony whereof, I affix my signature.

WM. F. LAMOREAUX.